US011962514B2

(12) United States Patent
Han et al.

(10) Patent No.: US 11,962,514 B2
(45) Date of Patent: *Apr. 16, 2024

(54) PARALLEL DATA PROCESSING FOR SERVICE FUNCTION CHAINS SPANNING MULTIPLE SERVERS

(71) Applicants: AT&T Intellectual Property I, L.P., Atlanta, GA (US); REGENTS OF THE UNIVERSITY OF MINNESOTA, Minneapolis, MN (US)

(72) Inventors: Bo Han, Bridgewater, NJ (US); Vijay Gopalakrishnan, Edison, NJ (US); Muhammad Bilal Anwer, Branchburg, NJ (US); Zhi-Li Zhang, Eden Prairie, MN (US); Yang Zhang, Saint Paul, MN (US)

(73) Assignees: AT&T Intellectual Property I, L.P, Atlanta, GA (US); REGENTS OF THE UNIVERSITY OF MINNESOTA, Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/168,553

(22) Filed: Feb. 13, 2023

(65) Prior Publication Data

US 2023/0198917 A1 Jun. 22, 2023

Related U.S. Application Data

(63) Continuation of application No. 17/498,440, filed on Oct. 11, 2021, now Pat. No. 11,582,167, which is a
(Continued)

(51) Int. Cl.
*G06F 13/00* (2006.01)
*G06F 9/455* (2018.01)
(Continued)

(52) U.S. Cl.
CPC ........ *H04L 49/208* (2013.01); *G06F 9/45558* (2013.01); *H04L 41/0806* (2013.01);
(Continued)

(58) Field of Classification Search
CPC ... H04L 49/208; H04L 41/0806; H04L 41/12; H04L 45/64; H04L 49/70; H04L 41/5054; G06F 9/45558; G06F 2009/45595
(Continued)

(56) References Cited

U.S. PATENT DOCUMENTS 7,031,304 B1   4/2006   Arberg et al.
8,213,313 B1   7/2012   Doiron et al.
(Continued)

FOREIGN PATENT DOCUMENTS

CN   108092803 B   5/2018
CN   108494574 A   9/2018
(Continued)

OTHER PUBLICATIONS

"NFP: Enabling Network Function Parallelism in NFV." Sun, Chen, et al., Proceedings of the Conference of the ACM Special Interest Group on Data Communication (pp. 43-56). ACM, 2017.
(Continued)

*Primary Examiner* — Kenneth R Coulter

(57) ABSTRACT

Systems, computer-readable media, and methods are disclosed for parallel data processing for service function chains with network functions spanning multiple servers. An example system includes a first server hosting a first network function of a service function chain, a second server hosting a second network function of the service function chain, a mirror function deployed in a first switch to replicate a plurality of packets received by the system and to send respective copies of the plurality of packets to the first network function and to at least one of the second network
(Continued)

function and a third network function of the service function chain, and a merge function deployed in a second switch to merge respective outputs of the first network function and the at least one of the second network function and the third network function.

20 Claims, 5 Drawing Sheets

Related U.S. Application Data continuation of application No. 16/220,683, filed on Dec. 14, 2018, now Pat. No. 11,146,506.

(51) Int. Cl.
  *H04L 41/0806* (2022.01)
  *H04L 41/12* (2022.01)
  *H04L 45/64* (2022.01)
  *H04L 49/00* (2022.01)
  *H04L 49/20* (2022.01)

(52) U.S. Cl.
  CPC ............. *H04L 41/12* (2013.01); *H04L 45/64* (2013.01); *H04L 49/70* (2013.01); *G06F 2009/45595* (2013.01)

(58) Field of Classification Search
  USPC ............... 709/224, 223; 718/1, 100–104
  See application file for complete search history.

(56) References Cited

U.S. PATENT DOCUMENTS

| | | | |
|---|---|---|---|
| 8,964,752 B2 | 2/2015 | Zhang et al. | |
| 9,130,774 B2 | 9/2015 | Regan | |
| 9,462,084 B2 | 10/2016 | Connor et al. | |
| 9,479,409 B2 | 10/2016 | Zhang et al. | |
| 9,706,472 B2 | 7/2017 | Roeland et al. | |
| 9,781,016 B1 | 10/2017 | Marquardt et al. | |
| 9,794,352 B2 | 10/2017 | Qiang | |
| 9,923,815 B2 | 3/2018 | Assarpour et al. | |
| 10,003,676 B2 | 6/2018 | Tran et al. | |
| 10,044,572 B1 | 8/2018 | Marquardt et al. | |
| 10,050,859 B2 | 8/2018 | Kim et al. | |
| 10,110,707 B2 | 10/2018 | Hwang et al. | |
| 11,064,045 B2* | 7/2021 | Huang | H04L 67/60 |
| 11,146,506 B2 | 10/2021 | Han et al. | |
| 11,582,167 B2* | 2/2023 | Han | H04L 41/5054 |
| 2014/0095685 A1 | 4/2014 | Cvijetic et al. | |
| 2014/0351801 A1 | 11/2014 | Shin et al. | |
| 2015/0186143 A1 | 7/2015 | Tran et al. | |
| 2016/0182684 A1 | 6/2016 | Connor et al. | |
| 2016/0301632 A1 | 10/2016 | Anand et al. | |
| 2016/0344611 A1 | 11/2016 | Más Ivars et al. | |
| 2017/0094002 A1 | 3/2017 | Kumar et al. | |
| 2017/0214578 A1 | 7/2017 | Singh | |
| 2017/0279712 A1 | 9/2017 | Nainar et al. | |
| 2017/0346752 A1 | 11/2017 | Krishnamurthy et al. | |
| 2018/0041524 A1 | 2/2018 | Reddy et al. | |
| 2018/0091420 A1 | 3/2018 | Drake et al. | |
| 2018/0114012 A1 | 4/2018 | Sood et al. | |
| 2018/0114013 A1 | 4/2018 | Sood et al. | |
| 2018/0139098 A1 | 5/2018 | Sunavala et al. | |
| 2018/0262420 A1 | 9/2018 | Jaffer et al. | |
| 2018/0302343 A1 | 10/2018 | Lokman et al. | |
| 2018/0331951 A1 | 11/2018 | Boutros et al. | |
| 2020/0067800 A1 | 2/2020 | Wang et al. | |
| 2020/0220791 A1 | 7/2020 | Aiello et al. | |
| 2021/0029218 A1* | 1/2021 | Huang | H04L 43/0852 |

FOREIGN PATENT DOCUMENTS

| | | | |
|---|---|---|---|
| WO | 2016206742 A1 | 12/2016 | |
| WO | 2018188738 A1 | 10/2018 | |

OTHER PUBLICATIONS

"Adaptive Service-Chain Routing for Virtual Network Functions in Software-Defined Networks." Dwaraki, Abhishek, and Tilman Wolf, Proceedings of the 2016 workshop on Hot topics in Middleboxes and Network Function Virtualization (pp. 32-37). ACM, 2016.
Katsikas, Georgios P., et al. "SNF: synthesizing high performance NFV service chains." PeerJ Computer Science 2 (2016): e98.
Sun, Chen, et al. "Nfp: Enabling network function parallelism in nfv." Proceedings of the Conference of the ACM Special Interest Group on Data Communication. ACM, 2017.
Zhang, Yang, et al. "Parabox: Exploiting parallelism for virtual network functions in service chaining." Proceedings of the Symposium on SDN Research. ACM, 2017.
Chowdhary, Ankur, and Dijiang Huang. "SDN based Network Function Parallelism in Cloud." arXiv preprint arXiv:1811.00653 (2018).
Kulkarni, Sameer G., et al. "Reinforce: Achieving Efficient Failure Resiliency for Network Function Virtualization based Services." (2018).
S. Kumar et al. Service Function Chaining Use Cases In Data Centers. Internet-Draft draft-ietf-sfc-dc-use-cases-05, IETF, 2016.
J. Napper et al. Service Function Chaining Use Cases in Mobile Networks. Internet-Draft draft-ietf-sfc-use-case-mobility-07, IETF, 2016.
J. Dean and S. Ghemawat. MapReduce: Simplified Data Processing on Large Clusters. Proc. OSDI, 2004.
J. M. Halpern and C. Pignataro. Service Function Chaining (SFC) Architecture. RFC 7665, Oct. 2015.
P. Bosshart, D. Daly, G. Gibb, M. Izzard, N. McKeown, J. Rexford, C. Schlesinger, D. Talayco, A. Vahdat, G. Varghese and D. Walker. P4: Programming Protocol-Independent Packet Processors. SIGCOMM CCR 2014. 2F0000000-0000004.pdf&usg= AOvVaw30V8D1Xm5LznejCkVE5yUk.
The P4 Language Specification, version 1.0.3; Nov. 2016.
Zafar Ayyub Qazi, Cheng-Chun Tu, Luis Chiang, Rui Miao, Vyas Sekar and Minlan Yu. SIMPLE-fying Middlebox Policy Enforcement Using SDN. In Proc. SIGCOMM 2013.
Ying Zhang, Neda Beheshti, Ludovic Beliveau, Geoffrey Lefebvre, Ramesh Mishra, Ritun Patney, Erik Rubow, Ramesh Subrahmaniam, Ravi Manghirmalani, Meral Shirazipour, Catherine Truchan and Mallik Tatipamula. stEERING: A software-defined networking for inline service chaining. In Proc. ICNP 2013.
D. Gusfield. Algorithms on Strings, Trees, and Sequences: Computer Science and Computational Biology. Cambridge University Press, New York, NY, USA, 1997.
Y. Zhang, B. Anwer, V. Gopalakrishnan, B. Han, J. Reich, A. Shaikh, and Z.-L. Zhang. ParaBox: Exploiting Parallelism for Virtual Network Functions in Service Chaining. In Proceedings of ACM Symposium on SDN Research (SOSR), 2017.

* cited by examiner

PARALLEL DATA PROCESSING FOR SERVICE FUNCTION CHAINS SPANNING MULTIPLE SERVERS

This application is a continuation of U.S. patent application Ser. No. 17/498,440, filed on Oct. 11, 2021, now U.S. Pat. No. 11,582,167, which is a continuation of U.S. patent application Ser. No. 16/220,683, filed on Dec. 14, 2018, now U.S. Pat. No. 11,146,506, both of which are herein incorporated by reference in their entirety.

This invention was made with government support under CNS1617729, CNS1618339, and CNS1836772 awarded by the National Science Foundation. The government has certain rights in the invention. This invention was made with government support under Grant No. HDTRA1-14-1-0040 awarded by the Department of Defense/Defense Threat Reduction Agency (DTRA). The government has certain rights in the invention.

The present disclosure relates generally to network function virtualization (NFV), and relates more particularly to devices, computer-readable media, and methods for parallel data processing for service function chains with network functions spanning multiple servers.

BACKGROUND

Upgrading a telecommunication network to a software defined network (SDN) architecture implies replacing or augmenting existing network elements that may be integrated to perform a single function with new network elements. The replacement technology may comprise a substrate of networking capability, often called network function virtualization infrastructure (NFVI) that is capable of being directed with software and SDN protocols to perform a broad variety of network functions and services. Network operators can create, update, remove, or scale on/in network functions (NFs) on-demand, construct sequences of NFs to form service function chains (SFCs), and steer traffic through SFCs to meet service requirements.

SUMMARY

Systems, computer-readable media, and methods are disclosed for parallel data processing for service function chains with network functions spanning multiple servers. An example system includes a first server hosting a first network function of a service function chain, a second server hosting a second network function of the service function chain, a mirror function deployed in a first switch to replicate a plurality of packets received by the system and to send respective copies of the plurality of packets to the first network function and to at least one of the second network function and a third network function of the service function chain, and a merge function deployed in a second switch to merge respective outputs of the first network function and the at least one of the second network function and the third network function.

In another example, a method includes obtaining a target service function chain spanning multiple servers of a network function virtualization infrastructure, wherein the target service function chain comprises a plurality of network functions to be executed on a plurality of packets in a defined sequence, and wherein at least a first network function and a second network function of the plurality of network functions are capable of being executed in a parallel manner, generating a plurality of candidate service function chains that utilize an available plurality of network function instances to execute the plurality of network functions in the defined sequence and selecting, from among the plurality of candidate service function chains, a first candidate service function chain to function as the target service function chain.

In another example, a non-transitory computer-readable medium stores instructions which, when executed by a processor deployed in a network function virtualization infrastructure, cause the processor to perform operations. The operations include obtaining a target service function chain spanning multiple servers of a network function virtualization infrastructure, wherein the target service function chain comprises a plurality of network functions to be executed on a plurality of packets in a defined sequence, and wherein at least a first network function and a second network function of the plurality of network functions are capable of being executed in a parallel manner, generating a plurality of candidate service function chains that utilize an available plurality of network function instances to execute the plurality of network functions in the defined sequence, and selecting, from among the plurality of candidate service function chains a first candidate service function chain to function as the target service function chain.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
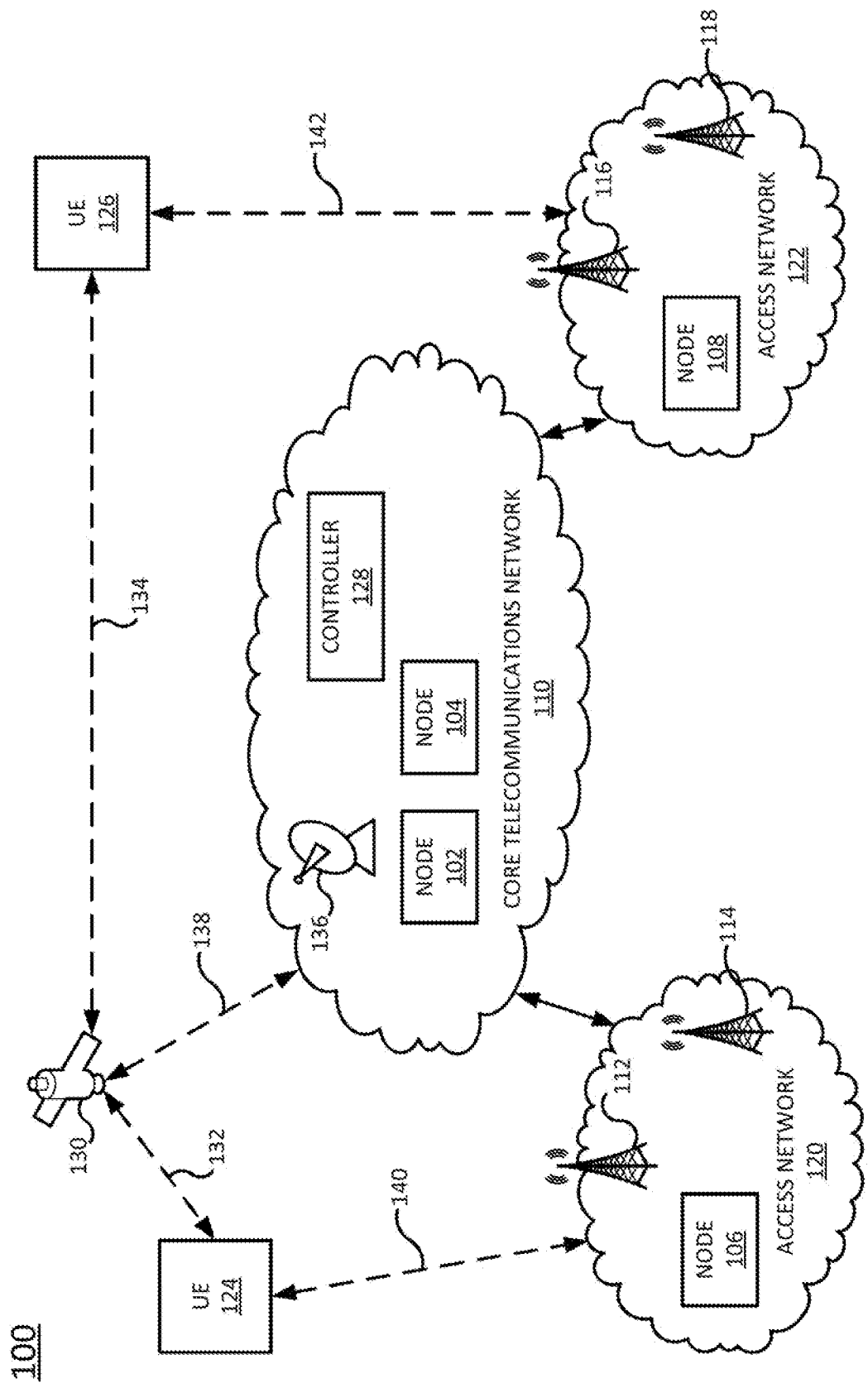
FIG. 1 illustrates an example system related to the present disclosure.

The present disclosure broadly discloses devices, computer-readable media, and methods for parallel data processing for service function chains (SFCs) with network functions (NFs) spanning multiple servers. As discussed above, network function virtualization (NFV) coupled with software defined networking (SDN) revolutionizes networking by allowing network operators to dynamically modify and manage networks. However, virtualization of NFs has also presented many new challenges. For instance, traffic traversing SFCs (i.e., sequences of NFs that are typically traversed in order by data flows) may suffer from reduced throughout and increased latency, relative to physical NFs. Moreover, as the length of an SFC (i.e., the number of NFs spanned by the SFC) increases, so does the overhead of the SFC. SFC chains are only likely to get longer as the flexibility offered by SDN and FV enable more complex network services to be deployed.

Examples of the present disclosure leverage a novel packet processing architecture which, when possible, mirrors packets to NFs in parallel and then intelligently merges the outputs of the NFs. The traffic output by the merge function is identical to the traffic output that would have resulted if the traffic had traversed the NFs in a sequential manner. Since not all VNFs will be eligible for parallelization, examples of the present disclosure identify opportunities for parallelism within a SFC, and the result may end up being a hybrid structure in which some NFs are traversed in sequence while other NFs are traversed in parallel.

Many NFs operate in edge clouds or data centers with clusters of servers. Since NFs tend to require a great deal of resources when handling large volumes of traffic, and since most servers can support up to a limited number of such NFs concurrently, it is likely that a SFC (especially a complex SFC comprising a large number of NFs) may include NFs that run on multiple servers. The dynamics of network services and elastic scalability offered by NFV may also make SFC deployment on a single server infeasible. For instance, cellular networks utilize tens of instances in the virtualized evolved packet core (EPC) of long term evolution (LTE) networks. The NFs in these cases are usually distributed over multiple servers, and sometimes even over multiple data centers.

Examples of the present disclosure determine where to place the mirror and merge functions that facilitate parallelization within a SFC whose NFs span multiple servers. If the mirror and merge functions are placed naively, bandwidth may be wasted and SFC latency may be increased. Further examples of the present disclosure determine a traffic distribution scheme to identify the optimal paths when steering traffic among NF instances across multiple servers. The traffic distribution scheme may employ a forwarding rule generation scheme that automatically creates rules for both software and hardware switches and enforces the rules appropriately.

In one example, the present disclosure includes a controller, e.g., a software-defined network (SDN) controller, to control the deployment of services, or functions of a communication network, to parallelize portions of a SFC. In a software defined network, a SDN controller may instantiate virtual network functions (VNFs) on shared hardware, which may be referred to as network function virtualization infrastructure (NFVI), host devices, or SDN nodes, and which may be physically located in various places. For example SDN nodes may reside in various data centers distributed in different locations. For example, a router may be instantiated on a SDN node, and released when the router is no longer needed. Similarly, a media server may be instantiated on a SDN node, and released when no longer needed. In one example, the configuring, releasing, and reconfiguring of SDN nodes is controlled by the SDN controller, which may store configuration code, e.g., computer/processor-executable programs, instruction, code, or the like for various functions which can be loaded onto an SDN node. In another example, the SDN controller may instruct, or request an SDN node to retrieve appropriate configuration code from a network-based repository, e.g., a storage device, to relieve the SDN controller from having to store and transfer configuration code for various functions to the SDN nodes.

To aid in understanding the present disclosure, FIG. 1 illustrates a block diagram depicting one example of a network, or system 100 suitable for performing or enabling the steps, functions, operations, and/or features described herein. The overall communications system 100 may include any number of interconnected networks which may use the same or different communication technologies. As illustrated in FIG. 1, system 100 may include a core telecommunications network 110. In one example, the core telecommunications network 110 may comprise a backbone network, or transport network, such as an Internet Protocol (IP)/multi-protocol label switching (MPLS) network, where label switched routes (LSRs) can be assigned for routing Transmission Control Protocol (TCP)/IP packets, User Datagram Protocol (UDP)/IP packets, and other types of protocol data units (PDUs). However, it will be appreciated that the present disclosure is equally applicable to other types of data units and transport protocols, such as Frame Relay, and Asynchronous Transfer Mode (ATM).

In one example, the core telecommunications network 110 uses network function virtualization infrastructure (NFVI), e.g., host devices or servers in a data center or data centers that are available as host devices to host virtual machines comprising virtual network functions (VNFs). In other words, at least a portion of the core telecommunications network 110 may incorporate software-defined network (SDN) components. In the example of FIG. 1, NFVI may be represented by nodes 102 and 104. Nodes 102 and 104 may each include central processing units (CPUs), or processors, memory to hold computer-readable/computer-executable instructions, code, and/or programs, and so forth. Thus, nodes 102 and 104 may comprise host devices that are configurable and reconfigurable to provide various network services and/or to perform various tasks and functions under the instruction of controller 128. For instance, nodes 102 and 104 may host configuration code and/or content for various network services. Nodes 102 and 104 may alternatively or additionally provide transcoding services, performing media compression, or perform any other network functions that may be deployed in a host device/NFVI in a NFV architecture.

In one embodiment, the core telecommunications network 110 may be in communication with one or more access networks 120 and 122. The access networks 120 and 122 may include a wireless network (e.g., an Institute of Electrical and Electronics Engineers (IEEE) 802.11/Wi-Fi network and the like), a cellular network (e.g., 2G, 3G, and 4G networks, a Long Term Evolution (LTE) network, 5G network, and the like), a circuit switched network (e.g., a public switched telephone network (PSTN)), a cable network, a digital subscriber line (DSL) network, a metropolitan area network (MAN), an Internet service provider (ISP) network, and the like. As such, in various examples the access points 112, 114, 116, and 118 may comprise wireless transceivers, cellular base stations, such as eNodeBs, and the like. In one example, the access networks 120 and 122 may include different types of networks. In another example, the access networks 120 and 122 may be the same type of network. In one example, the access networks 120 and 122 may be operated by a same entity as the core telecommunications network 110.

In one example, the access networks 120 and 122 may also include NFVI that is controlled by the controller 128, e.g., nodes 106 and 108. Nodes 106 and 108 may each include central processing units (CPUs), or processors, memory to hold computer-readable/computer-executable instructions, code, and/or programs, and so forth. Thus, nodes 106 and 108 may comprise host devices that are configurable and reconfigurable to provide various network services and/or to perform various tasks and functions under the instruction of controller 128. For instance, nodes 106 and 108 may host configuration code and/or content for various network services. Nodes 106 and 108 may alternatively or additionally provide transcoding services, performing media compression, or perform any other network functions that may be deployed in a host device/NFVI in a NFV architecture.

As illustrated in FIG. 1, the system 100 may further include user endpoint (UE) devices 124 and 126. UEs 124 and 126 may comprise any type of wireless communication-capable mobile telephony and computing device (broadly, a "mobile device"), such as: a mobile phone, a smartphone, a computing tablet, a messaging device, a personal computer, a laptop computer, a Personal Digital Assistant (PDA), a wearable "smart" device (e.g., a smart watch or a fitness tracker), a portable gaming device, and the like. For instance, UEs 124 and 126 may be equipped with at least one cellular radio/transceiver for cellular communications. In another example, UEs 124 and 126 may comprise wired devices capable of communicating over a network, such as a desk top computer, a set top box (STB), a smart television, an Internet of Things (IoT) device (e.g., a smart thermostat, a smart security system, etc.). UEs 124 and 126 may also be equipped for any number of different modes of communication. For instance, UEs 124 and 126 may alternatively or additionally be equipped with an IEEE 802.11 (Wi-Fi) transceiver, an IEEE 802.16 (e.g., wireless metropolitan area network/WiMAX) transceiver, an IEEE 802.15 transceiver (e.g., Bluetooth, ZigBee, etc.), and so on.

In one example, the nodes 102-108 may be managed by the controller 128. In one example, controller 128 may comprise an SDN controller that is responsible for such functions as provisioning and releasing instantiations of VNFs to perform the functions of routers, switches, and other devices, provisioning routing tables and other operating parameters for the VNFs, generating and pushing packet forwarding rules to switches, and so forth. In one example, controller 128 may maintain communications with VNFs and/or nodes 102-108 via a number of control links. Control links may comprise secure tunnels for signaling communications over an underling IP infrastructure of core telecommunications network 110 and/or access networks 120 and 122. In other words, control links may comprise virtual links multiplexed with transmission traffic and other data carried over a shared set of physical links. In one example, the controller 128 may also comprise a virtual machine operating on NFVI/host device(s), or may comprise a dedicated device. For instance, controller 128 may be collocated with one or more VNFs, or may be deployed in a different host device or at a different physical location. In one example, the controller 128 may comprise a computing system or server, such as computing system 500 depicted in FIG. 5, and may be configured to establish parallel data processing for SFCs with NFs spanning multiple servers, as described herein. For instance, the controller 128 may be configured to perform the steps, functions, and/or operations of the method 300, described below, to generate forwarding rules for hardware and software switches in SFCs spanning multiple servers, and/or to perform any other functions described herein.

In accordance with the present disclosure, the management functions of controller 128 may include determining where in a SFC to place the mirror and merge functions that facilitate parallelization. Further management functions of controller 128 may include determining a traffic distribution scheme to identify the optimal paths when steering traffic among NF instances across multiple servers and determining a forwarding rule generation scheme that automatically creates rules for both software and hardware switches and enforces the rules appropriately.

As illustrated in the example of FIG. 1, UEs 124 and 126 may communicate with satellite 130 via satellite links 132 and 134, respectively. In another example, UEs 124 and 126 may be limited to receiving low-bandwidth downlink communications. For instance, UEs 124 and 126 may include GPS receivers for receiving GPS broadcasts from satellite 130. In one example, satellite 130 may communicate with a ground station 136 via satellite link 138. In one example, satellite 130 may be controlled and/or operated by a same network service provider as core telecommunications network 110. In another example, satellite 130 may be controlled and/or operated by a different entity and may carry communications between UEs 124 and 126 and core telecommunications network 110.

As further illustrated in FIG. 1, UEs 124 and 126 may be within communication range of access networks 120 and 122, respectively via links 140 and 142. For instance, links 140 and 142 may comprise cellular links to access points 112 and 116 respectively, which may comprise eNodeBs in such an example.

UEs 124 and 126 may request services from core telecommunications network 110 via links 140 and 142, access nodes 112 and 116, and access networks 120 and 122, respectively. In one example, the service requests may be processed by controller 128. The service requests may be for a voice or video call service, a conference call service, a streaming media service, a data access service, an Internet access service, and so forth. Each of the service requests may include an identification of the requesting UE, the service requested, any content requested in addition to the service, a bandwidth requirement, a latency requirement, and so forth.

It should be noted that the system 100 has been simplified. In other words, the system 100 may be implemented in a different form than that illustrated in FIG. 1. For example, the system 100 may be expanded to include additional networks, and additional network elements (not shown) such as border elements, routers, switches, policy servers, security devices, gateways, a network operations center (NOC), a content distribution network (CDN) and the like, without altering the scope of the present disclosure. In addition, system 100 may be altered to omit various elements, substitute elements for devices that perform the same or similar functions and/or combine elements that are illustrated as separate devices. Thus, these and other modifications of the system 100 are all contemplated within the scope of the present disclosure.

Figure 2A:
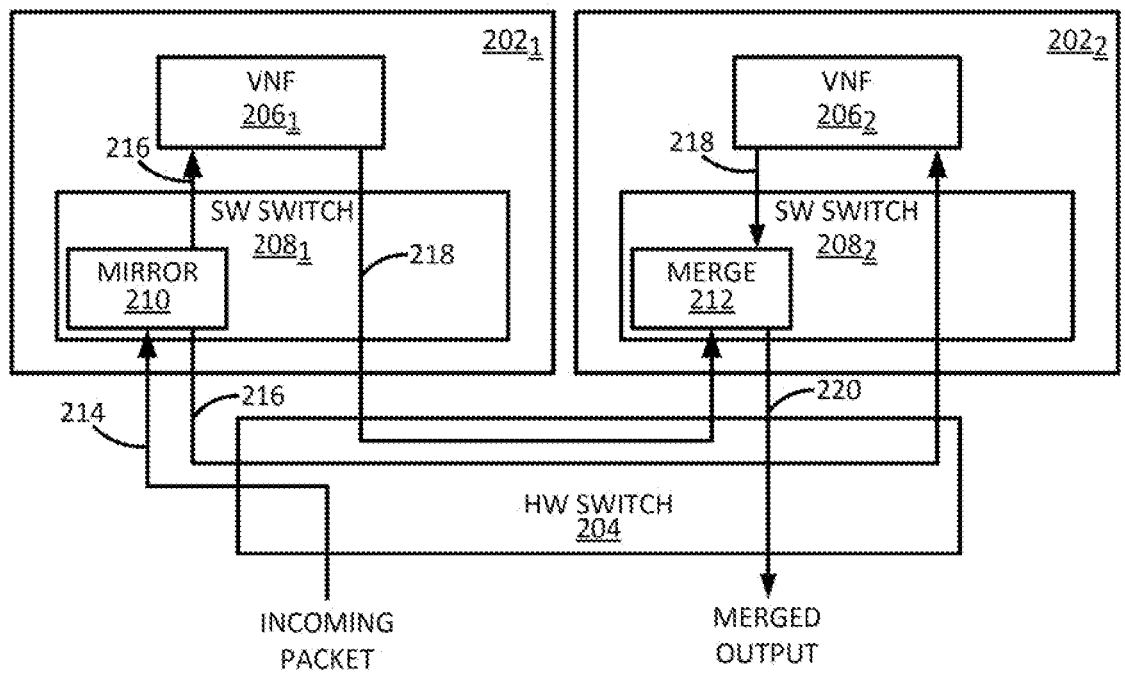
FIGS. 2A-2C illustrate various example configurations through which parallel processing may be deployed in a service function chain spanning multiple servers.
Figure 2B:
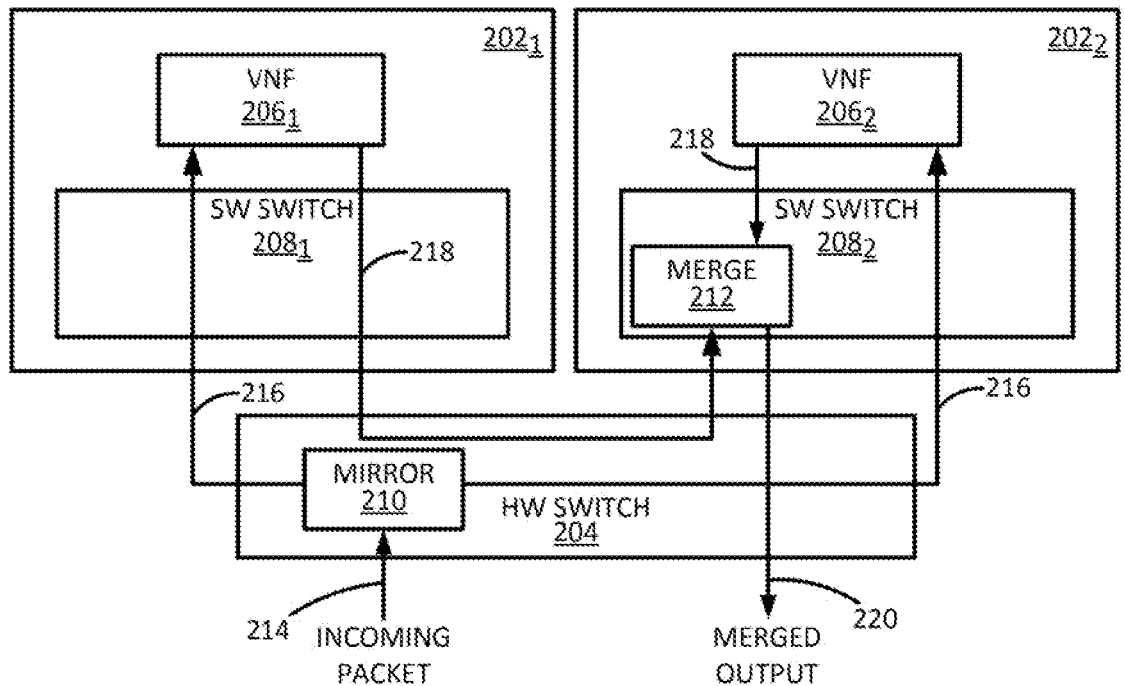
Figure 2C:
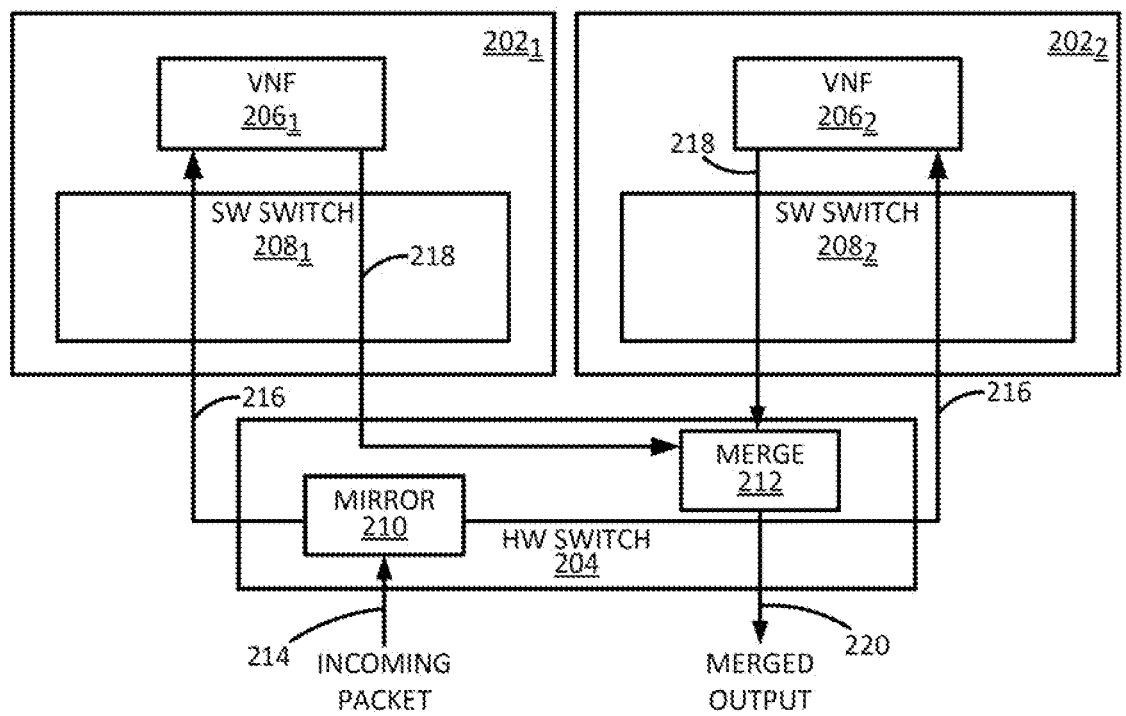

FIGS. 2A-2C illustrate various example configurations through which parallel processing may be deployed in a service function chain spanning multiple servers. In particular, FIGS. 2A-2C illustrate an example system of servers and switches hosting a SFC, and various locations within the system for deploying mirror and merge functions to enable parallel processing. As such, FIGS. 2A-2C may illustrate a portion of one or more of the nodes 102-108 of FIG. 1.

For instance, FIG. 2A illustrates a first example configuration. As illustrated in FIG. 2A, the system 200 comprises a plurality of servers, including a first server $202_1$ and a second server $202_2$ (hereinafter collectively referred to as "servers 202"), connected via a hardware (HW) switch 204. In one example, the HW switch 204 may be a P4 open-source programming language switch, which exposes a standard set of primitive actions (including bit_or and bit_xor). However, other types of switches may also be used for the HW switch 204. Moreover, it should be noted that although two servers 202 are illustrated, the system 200 may include any number of servers greater than one. Thus, the system 200 may comprise a part of a larger system or SFC.

The first server $202_1$ may host a first virtual network function (VNF) $206_1$, while the second server $202_2$ may host a second VNF $206_2$ (hereinafter collectively referred to as "VNFs 206"). Collectively, the first VNF $206_1$ and the second VNF $206_2$ may form a service function chain. For instance, the SFC may comprise a network security system in which the first VNF $206_1$ and the second VNF $206_2$ may each provide a function such as intrusion detection, traffic shaping, or the like. It should be noted that although two VNFs 206 are illustrated, the system 200 may include any number of VNFs greater than one. Moreover, although FIG. 2A illustrates a one-to-one correspondence between servers 202 and VNFs 206, some servers may host more than one VNF.

The first server $202_1$ may also include a first software (SW) switch $208_1$, while the second server $202_2$ may also include a second SW switch $208_2$ (hereinafter collectively referred to as "SW switches 208"). The first SW switch $208_1$ and the second SW switch $208_2$ may cooperate with the HW switch 204 to forward traffic (e.g., packets) to the appropriate VNFs 206, e.g., according to forwarding rules that are generated by a controller such as the controller 128 of FIG. 1.

For instance, in one example, each of the servers 202 may include a local daemon (not shown) that communicates with the controller. The local daemon may receive forwarding rules from the controller and push the forwarding rules to the SW switch 208 on the server 202. At least some of the forwarding rules may enable parallel packet processing by the VNFs 206. The local daemon may also report the run-time state of the data plane and system load information in response to queries from the controller.

In further examples, the controller may also inform the data plane of the operations of the VNFs 206. This is useful if, for instance, certain VNFs 206 add or delete bytes in data packets (e.g., bytes indicating a virtual local area network ID) which may be needed by the data plane to correctly merge the outputs of parallelized VNFs 206. In addition, VNFs 206 that do not modify packets (e.g., traffic shapers) may use information about other VNF operations in order to optimize the merge function.

The HW switch 204 may employ more coarse-grained forwarding rules, since NF-level traffic steering is typically performed by the software switches 208. As such, the HW switch 204 may not need to know the more fine-grained traffic forwarding details.

A mirror function 210 and a merge function 212 are used to enable parallel processing by the VNFs 206. In particular, the mirror function 210 mirrors or replicates an incoming packet, so that a first copy of the packet can be sent to the first VNF $206_1$ and a second copy of the packet can be sent to the second VNF $206_2$ at the same time. The first VNF $206_1$ and the second VNF $206_2$ may then process their respective copies of the packet simultaneously to produce a first output and a second output, respectively. The merge function obtains the first output and the second output and merges the first output with the second output to produce a single merged output. The single merged output is identical to the output that would have resulted if the original incoming packet had been processed in sequence by the first VNF $206_1$ and the second VNF $206_2$, but is obtained more quickly through the parallel processing.

FIG. 2A illustrates an example in which the mirror function 210 resides on the first SW switch $208_1$ of the first server $202_1$, and the merge function 212 resides on the second SW switch $208_2$ of the second server $202_2$. Thus, in operation, an incoming packet is directed to the mirror function 210, as indicated by flow 214. The mirror function 210 replicates the incoming packet and sends the copies of the incoming packet to the first VNF $206_1$ and the second VNF $206_2$ simultaneously, as indicated by flow 216. The first VNF $206_1$ and the second VNF $206_2$ simultaneously process the respective copies of the incoming packet, and send the respective results to the merge function 212, as indicated by flow 218. The merge function 212 then merges the respective results and outputs a merged output, as indicated by flow 220.

Thus, the configuration illustrated in FIG. 2A avoids the sending of packets back and forth between the first server $202_1$ and the second server $202_2$. There will be two outgoing flows from the first server $202_1$ (i.e., flows 216 and 218) and two incoming flows to the second server $202_2$ (i.e., flows 216 and 218). By contrast, sequential packet processing by the first server $202_1$ and the second server $202_2$ would likely generate one incoming flow and one outgoing flow per server. Thus, although the configuration illustrated in FIG. 2A may accelerate processing relative to a sequential configuration, the configuration illustrated in FIG. 2A will utilize more bandwidth than a sequential configuration.

FIG. 2B illustrates an example of the same system 200 of FIG. 2A, but in which the mirror function 210 resides on the HW switch 204, and the merge function 212 resides on the second SW switch $208_2$ of the second server $202_2$. Thus, in operation, an incoming packet is directed to the mirror function 210, as indicated by flow 214. The mirror function 210 replicates the incoming packet and sends the copies of the incoming packet to the first VNF $206_1$ and the second VNF $206_2$ simultaneously, as indicated by flow 216. The first VNF $206_1$ and the second VNF $206_2$ simultaneously process the respective copies of the incoming packet, and send the respective results to the merge function 212, as indicated by flow 218. The merge function 212 then merges the respective results and outputs a merged output, as indicated by flow 220.

Thus, the configuration illustrated in FIG. 2B reduces the number of outgoing flows from the first server $202_1$, relative to the configuration illustrated in FIG. 2A. In particular, there will be one outgoing flow from the first server $202_1$ (i.e., flow 218); however, there are still two incoming flows to the second server $202_2$ (i.e., flows 216 and 218). Thus, although the configuration illustrated in FIG. 2B may accelerate processing relative to a sequential configuration and will utilize less bandwidth than the configuration illustrated in FIG. 2A, the configuration illustrated in FIG. 2B will still utilize more bandwidth than a sequential configuration.

FIG. 2C illustrates an example of the same system 200 of FIGS. 2A and 2B, but in which both the mirror function 210 and the merge function 212 reside on the HW switch 204. Thus, in operation, an incoming packet is directed to the mirror function 210, as indicated by flow 214. The mirror function 210 replicates the incoming packet and sends the copies of the incoming packet to the first VNF $206_1$ and the second VNF $206_2$ simultaneously, as indicated by flow 216. The first VNF $206_1$ and the second VNF $206_2$ simultaneously process the respective copies of the incoming packet, and send the respective results to the merge function 212, as indicated by flow 218. The merge function 212 then merges the respective results and outputs a merged output, as indicated by flow 220.

Thus, the configuration illustrated in FIG. 2C reduces the number of outgoing flows from both the first server $202_1$ and the second server $202_2$, relative to the configurations illustrated in FIGS. 2A and 2B. In particular, there will be one outgoing flow from the first server $202_1$ (i.e., flow 218) and one incoming flow to the second server $202_2$ (i.e., flow 216). Thus, the configuration illustrated in FIG. 2C may accelerate processing relative to a sequential configuration while utilizing the same amount of bandwidth as a sequential configuration.

Further examples of the present disclosure consider how NFs are loaded onto each server and connected with (hardware and software) switches in a SFC, as well as the overall SFC configuration, to calculate optimized paths in SFC chains that span multiple servers. The optimized paths may be designed to support NF scaling during times in which increased workloads are experienced.

Figure 3:
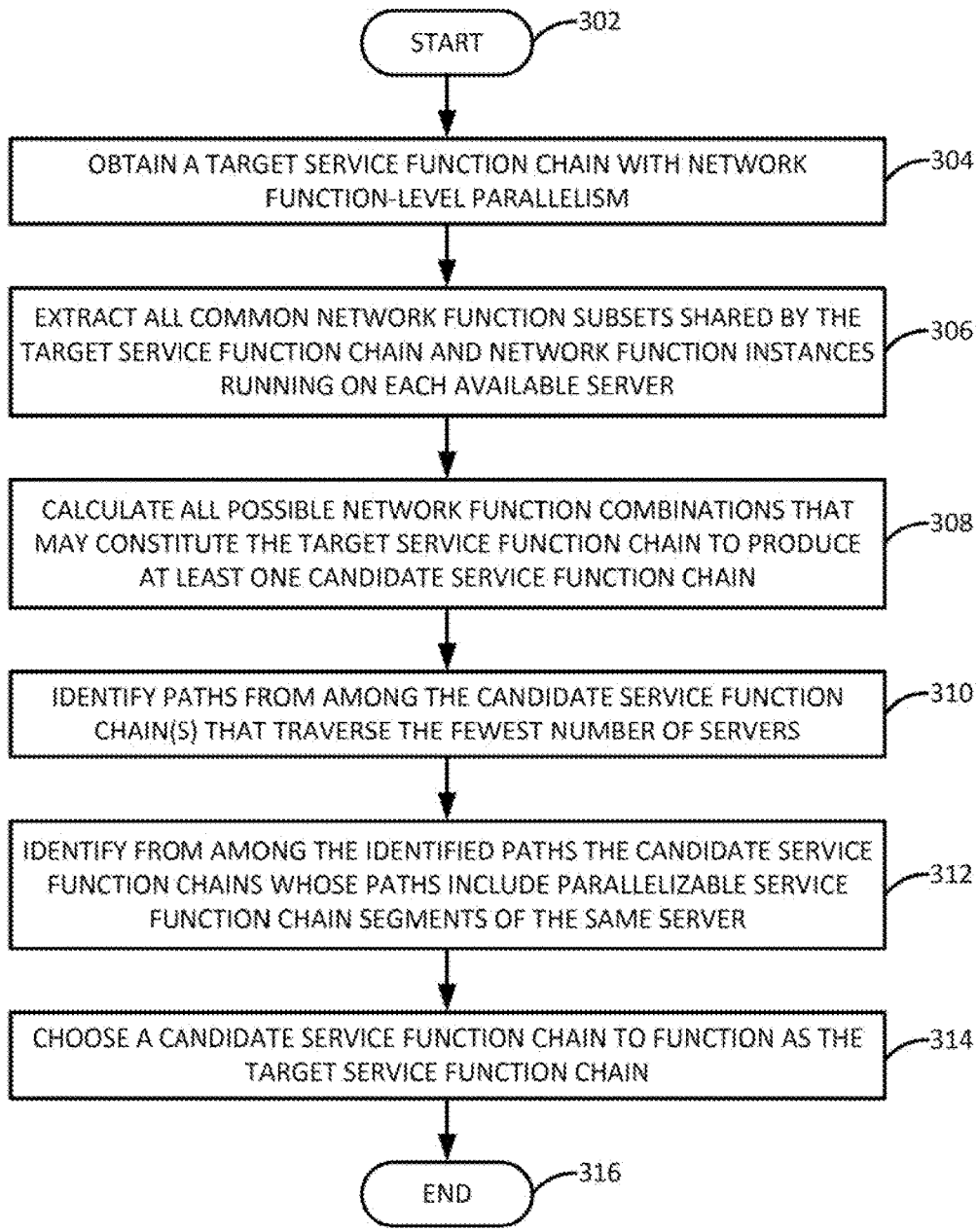
FIG. 3 illustrates a flowchart of an example method for distributing traffic in a service function chain spanning multiple servers, in accordance with the present disclosure.

FIG. 3 illustrates a flowchart of an example method 300 for distributing traffic in a service function chain spanning multiple servers, in accordance with the present disclosure. In one example, steps, functions and/or operations of the method 300 may be performed by a controller, e.g., controller 128 in conjunction with other components of the system 100. In one example, the steps, functions, or operations of method 300 may be performed by a computing device or system 500, and/or processor 502 as described in connection with FIG. 5 below. For example, computing device or system 500 may represent an SDN controller. For illustrative purposes, the method 300 is described in greater detail below in connection with an example performed by a processor, such as processor 502.

In one example, the method 300 analyzes a target SFC (i.e., a SFC to be deployed) to select through which servers/NFs the SFC should be routed. That is, a plurality of servers may host a plurality of NFs that may be used to deploy the SFC. In some cases, the plurality of servers may collectively host multiple instances of one or more NFs required by the SFC. In this case, the method 300 may select which instance(s) of the NF(s) should be selected for inclusion in the SFC.

For example, FIG. 4, which may be referred to in connection with FIG. 3 for understanding, illustrates an example system 400 including a plurality of servers $402_1$-$402_3$ (hereinafter individually referred to as a "server 402" or collectively referred to as "servers 402"). A plurality of NFs $404_1$-$404_5$ (hereinafter individually referred to as a "NF 404" or collectively referred to as "NFs 404") are hosted on the servers 402 and labeled as A, B, or C (where, A, B, and C may represent various network functions such as an intrusion prevention system, monitoring, load balancing, and the like). The order in which the NFs 404 operate on incoming traffic may vary according to the SFC, as shown in the example chart which shows SFCs for various traffic classifications.

Referring back to FIG. 3, the method begins in step 302 and proceeds to step 304. In step 304, the processor may obtain a target SFC with NF-level parallelism (i.e., an SFC in which two or more NFs are parallelizable). For instance, if the target SFC is A→B→C→D→(E and F), this may indicate that packets should be processed by NFs A, B, C, and D (in that order) before being processed in parallel by NFs E and F.

In step 306, the processor may extract all common NF subsets shared by the target SFC and NF instances running on each available server. In this case, the NFs running on each server may not have order constraints, but the target SFC has to follow a certain order. Thus, step 306 may start by determining all NF order combinations on each server and then extracting all common NFs shared by the target SFC and NF instances running on each server. In one example, an algorithm such as the longest common string (LCS) may be used to extract the common NFs.

Figure 4:
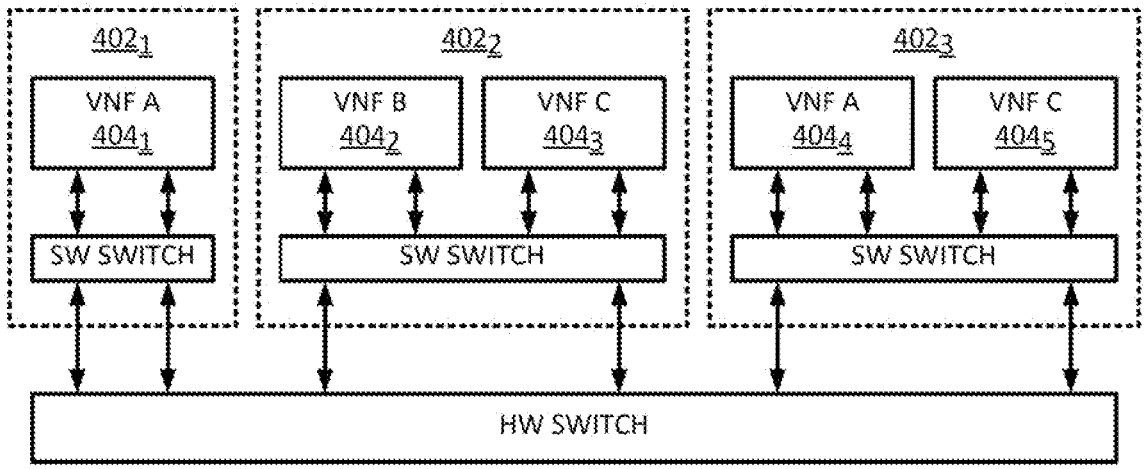
FIG. 4, which may be referred to in connection with FIG. 3 for understanding, illustrates an example system including a plurality of servers.

For instance, in the example of FIG. 4, the NF order combinations would be <B>, <C>, <C→B>, and <B→C> for the server $402_2$. The common NFs shared by the server $402_2$ and the example target SFC would then be <B>, <C>, and <B→C>. The result of step 306 is thus at least one segment of the target SFC (e.g., an individual NF or a sub-sequence of NFs constituting less than the whole of the SFC).

In step 308, the processor may calculate all possible NF combinations (e.g., combinations of the available NF instances) that may constitute the target SFC. In one example, step 308 involves breaking the target SFC into segments, and then checking all possible combinations of SFC segments from step 306 that may constitute the target SFC. In one example, a dynamic programming algorithm may be employed to carry out step 308. The result of step 308 is at least one candidate SFC (i.e., a possible sequence of NFs from among the available NFs that is capable of functioning as the target SFC).

In step 310, the processor may identify the paths from among the candidate SFCs that traverse the fewest number of servers. In one example, paths that traverse a greater number of servers are filtered out or eliminated from consideration. The assumption driving step 310 is that inter-processor communication within a single server is less costly than inter-processor communication across multiple servers. Thus, in step 310, the candidate SFCs may be ranked according to the number of servers the respective paths traverse (e.g., where the fewer the number of servers traversed, the higher the ranking), and a predefined number of the highest ranking candidate SFCs (e.g., the n highest-ranked SFCs) may be selected for further consideration.

In step 312, the processor may identify, from among the remaining candidate SFCs, the candidate SFCs whose paths include parallelizable SFC segments on the same server. For instance, referring back to FIG. 4, the parallelizable NFs B and C of the example target SFC both reside on the server $402_2$. In one example, it may be desirable to carry out parallelizable segments on the same server. However, in other examples, the parallelizable NFs may be hosted on separate servers. The result of step 312 is at least one candidate SFC that carries out the functions of the target SFC while distributing traffic in the most optimal manner possible.

In step 314, the processor may choose a candidate SFC (e.g., from among those identified in step 312) to function as the target SFC. The target SFC may subsequently be deployed by the processor on a plurality of servers in accordance with the selected candidate SFC.

The method 300 may end in step 316.

In one example, a sub-step of step 306 may involve a backtracing algorithm having a run time and space complexity of $O(2^n)$, where n is the number of NF instances running on a single server. Since n is typically small, the backtracing algorithm's run time and space complexity can be assumed to be a constant number (e.g., in one example no more than sixteen, assuming up to four NF instances are running on one server). The solution to the LCS problem, which may be used to extract common NFs, may be based on a suffix tree, making the time and space complexity of the LCS algorithm $O(m+n)$, where m is the length of the target SFC. Furthermore, the time complexity of step 308 is $O(t^3)$, where t is the number of SFC segments generated by step 306, while the auxiliary space used by the method 300 is O($t^2$). Thus, for practical SFCs, the overall time and space complexity can be achieved by the method 300 in polynomial time.

The outputs of the method 300 comprise optimized paths for the target SFC with NF-level parallelism, for a given network topology and given VNF instance deployments. In order to implement parallelism at the network traffic level, in one example, an additional step of traffic partitioning may be implemented. For instance, examples of the present disclosure may analyze NF configurations and operational rules to preserve affinity for traffic partitions. As an example, an intrusion prevent system may maintain a host-based state, while a network address translator may maintain a flow-based state. In this case, examples of the present disclosure may choose to guarantee host-wide affinity, because host-wide affinity is a superset of flow-wide affinity.

Further examples of the present disclosure contemplate how to handle traffic increases to an SFC deployed according to the method 300. According to one example, sub-optimal paths may be deployed. In this case, the network topology may not change, and the intermediate results of the method 300 can be employed to pursue sub-optimal paths. For instance, step 312 may consider SFCs in which the parallelizable NFs may be hosted on separate servers rather than the same server. Similarly, step 310 could consider paths traversing a greater number of servers.

In another example, traffic increases may be addressed by launching more NF instances. Typically, initial placements of NFs are decided by (human) network operators and may change over time. When an NF instance becomes overloaded, new instances of the NF or new servers loaded with the NF may be added to a node. In one example, every time the network topology is changed (e.g., a new NF instance and/or new server is added), the method 300 may be re-run to take the changed topology into consideration. For instance, the change in network topology may produce a new candidate path for an SFC that is better than the SFC's current path. Active flow information may be extracted from any software switches in this case before new forwarding rules are installed. In this case, the partitioning and distribution of incoming traffic across the new and old NF instances may avoid state migration.

It should be noted that the method 300 may be expanded to include additional steps. It should also be noted that although not specifically specified, one or more steps, functions or operations of the method 300 may include a storing, displaying and/or outputting step as required for a particular application. In other words, any data, records, fields, and/or intermediate results discussed in the respective methods can be stored, displayed and/or outputted to another device as required for a particular application. Furthermore, steps or blocks in FIG. 3 that recite a determining operation or involve a decision do not necessarily require that both branches of the determining operation be practiced. In other words, one of the branches of the determining operation can be deemed as an optional step. In addition, one or more steps, blocks, functions, or operations of the above described method 300 may comprise optional steps, or can be combined, separated, and/or performed in a different order from that described above, without departing from the example embodiments of the present disclosure.

As such, the present disclosure provides at least one advancement in the technical field of network function virtualization (NFV). For instance, examples of the present disclosure determine where to place the mirror and merge functions that facilitate parallelization within a SFC whose NFs span multiple servers. Further examples of the present disclosure determine a traffic distribution scheme to identify the optimal paths when steering traffic among NF instances across multiple servers. The traffic distribution scheme may employ a forwarding rule generation scheme that automatically creates rules for both software and hardware switches and enforces the rules appropriately.

Figure 5:
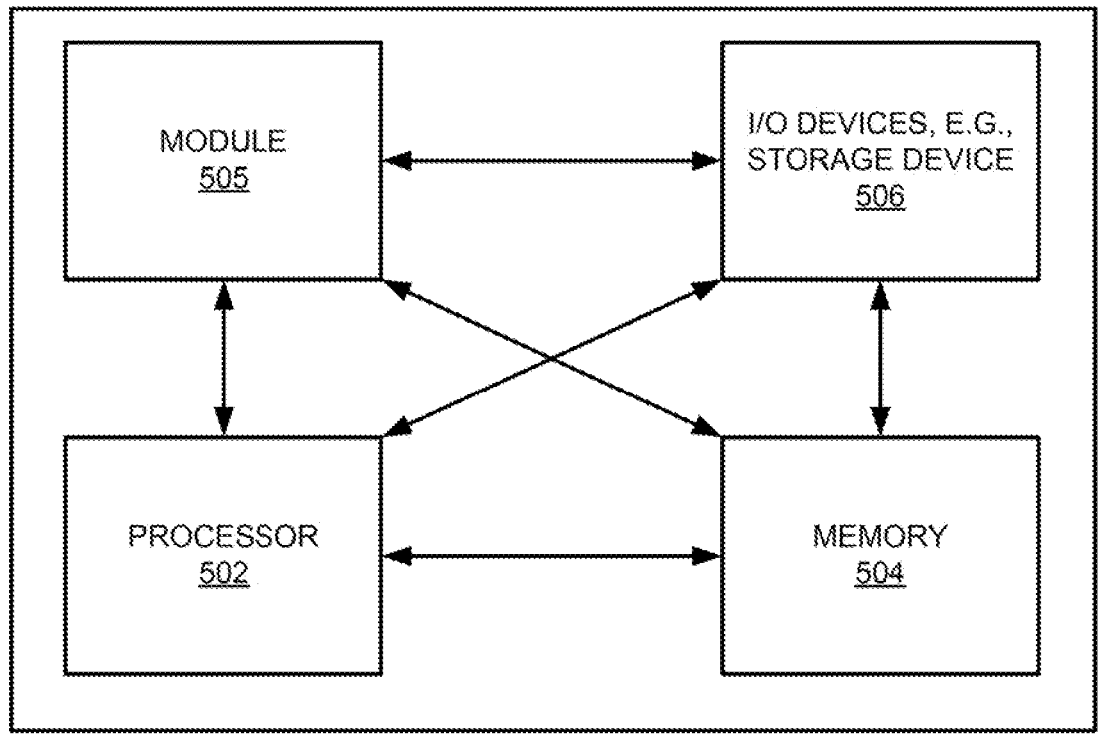
FIG. 5 illustrates an example high-level block diagram of a computer specifically programmed to perform the steps, functions, blocks, and/or operations described herein.

FIG. 5 depicts a high-level block diagram of a computing device programmed, or configured to perform the functions described herein. As depicted in FIG. 5, the system 500 comprises one or more hardware processor elements 502 (e.g., a central processing unit (CPU), a microprocessor, or a multi-core processor), a memory 504 (e.g., random access memory (RAM) and/or read only memory (ROM)), a module 505 for parallel data processing for SFCs with NFs spanning multiple servers, and various input/output devices 506 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 300 as discussed above is implemented in a distributed or parallel manner for a particular illustrative example, i.e., the steps of the above method 300, or the entire method 300 is implemented across multiple or parallel computing device, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method(s) discussed above can be used to configure a hardware processor to perform the steps, functions and/or operations of the above disclosed method 300. In one embodiment, instructions and data for the present module or process 505 for parallel data processing for SFCs with NFs spanning multiple servers (e.g., a software program comprising computer-executable instructions) can be loaded into memory 504 and executed by hardware processor element 502 to implement the steps, functions or operations as discussed above in connection with the illustrative method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 505 for parallel data processing for SFCs with NFs spanning multiple servers (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described exemplary embodiments, but should be defined only in accordance with the following claims and their equivalents.

What is claimed is:

1. A method comprising:
   obtaining, via a processor, a target service function chain spanning multiple servers of a network function virtualization infrastructure, wherein the target service function chain comprises a plurality of network functions to be executed on a plurality of packets in a defined sequence, and wherein at least a first network function and a second network function of the plurality of network functions are capable of being executed in a parallel manner;
   generating, via the processor, a plurality of candidate service function chains that utilize an available plurality of network function instances to execute the plurality of network functions in the defined sequence; and
   selecting, via the processor from among the plurality of candidate service function chains, a first candidate service function chain to function as the target service function chain, wherein the first candidate service function chain minimizes a number of servers traversed relative to other candidate service function chains of the plurality of candidate service function chains.

2. The method of claim 1, wherein the generating comprises extracting a plurality of common network function subsets shared by the target service function chain and the available plurality of network function instances running on each server of a plurality of servers of the network function virtualization infrastructure, and wherein the extracting produces a plurality of segments of the target service function chain.

3. The method of claim 2, wherein the extracting is performed using a longest common string algorithm.

4. The method of claim 2, wherein the first network function and the second network function are hosted on a common server of the plurality of servers of the network function virtualization infrastructure.

5. The method of claim 2, wherein the first network function and the second network function are hosted on different servers of the plurality of servers of the network function virtualization infrastructure.

6. The method of claim 1, wherein the number of servers traversed includes a first server that hosts instances of both the first network function and the second network function.

7. The method of claim 1, further comprising:
   deploying the target service function chain in accordance with the first candidate service function chain.

8. The method of claim 7, wherein the deploying comprises:
   pushing a packet forwarding rule to a server included in the first candidate service function chain.

9. The method of claim 1, further comprising:
   repeating the generating and the selecting for the target service function chain upon a change in a topology of the network function virtualization infrastructure.

10. A non-transitory computer-readable medium storing instructions which, when executed by a processing system including at least one processor deployed in a network function virtualization infrastructure, cause the processing system to perform operations, the operations comprising:
    obtaining a target service function chain spanning multiple servers of the network function virtualization infrastructure, wherein the target service function chain comprises a plurality of network functions to be executed on a plurality of packets in a defined sequence, and wherein at least a first network function and a second network function of the plurality of network functions are capable of being executed in a parallel manner;
    generating a plurality of candidate service function chains that utilize an available plurality of network function instances to execute the plurality of network functions in the defined sequence; and
    selecting, from among the plurality of candidate service function chains, a first candidate service function chain to function as the target service function chain, wherein the first candidate service function chain minimizes a number of servers traversed relative to other candidate service function chains of the plurality of candidate service function chains.

11. The non-transitory computer-readable medium of claim 10, wherein the generating comprises extracting a plurality of common network function subsets shared by the target service function chain and the available plurality of network function instances running on each server of a plurality of servers of the network function virtualization infrastructure, and wherein the extracting produces a plurality of segments of the target service function chain.

12. The non-transitory computer-readable medium of claim 11, wherein the extracting is performed using a longest common string algorithm.

13. The non-transitory computer-readable medium of claim 11, wherein the first network function and the second network function are hosted on a common server of the plurality of servers of the network function virtualization infrastructure.

14. The non-transitory computer-readable medium of claim 11, wherein the first network function and the second network function are hosted on different servers of the plurality of servers of the network function virtualization infrastructure.

15. The non-transitory computer-readable medium of claim 10, wherein the number of servers traversed includes a first server that hosts instances of both the first network function and the second network function.

16. The non-transitory computer-readable medium of claim 10, the operations further comprising:
    deploying the target service function chain in accordance with the first candidate service function chain.

17. The non-transitory computer-readable medium of claim 16, wherein the deploying comprises:
    pushing a packet forwarding rule to a server included in the first candidate service function chain.

18. An apparatus comprising:
a processing system including at least one processor; and
a non-transitory computer-readable medium storing instructions which, when executed by the processing system when deployed in a network function virtualization infrastructure, cause the processing system to perform operations, the operations comprising:
obtaining a target service function chain spanning multiple servers of the network function virtualization infrastructure, wherein the target service function chain comprises a plurality of network functions to be executed on a plurality of packets in a defined sequence, and wherein at least a first network function and a second network function of the plurality of network functions are capable of being executed in a parallel manner;
generating a plurality of candidate service function chains that utilize an available plurality of network function instances to execute the plurality of network functions in the defined sequence; and
selecting, from among the plurality of candidate service function chains, a first candidate service function chain to function as the target service function chain, wherein the first candidate service function chain minimizes a number of servers traversed relative to other candidate service function chains of the plurality of candidate service function chains.

19. The apparatus of claim 18, wherein the generating comprises extracting a plurality of common network function subsets shared by the target service function chain and the available plurality of network function instances running on each server of a plurality of servers of the network function virtualization infrastructure, and wherein the extracting produces a plurality of segments of the target service function chain.

20. The apparatus of claim 19, wherein the extracting is performed using a longest common string algorithm.

* * * * *